Jan. 3, 1961
M. G. AXMAN
2,967,045
TURNING ATTACHMENT FOR VEHICLES
Filed Sept. 3, 1957
2 Sheets-Sheet 1
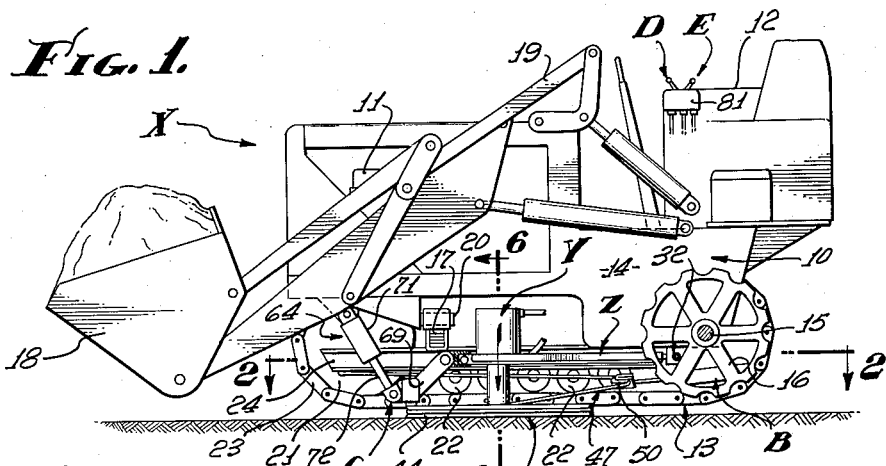
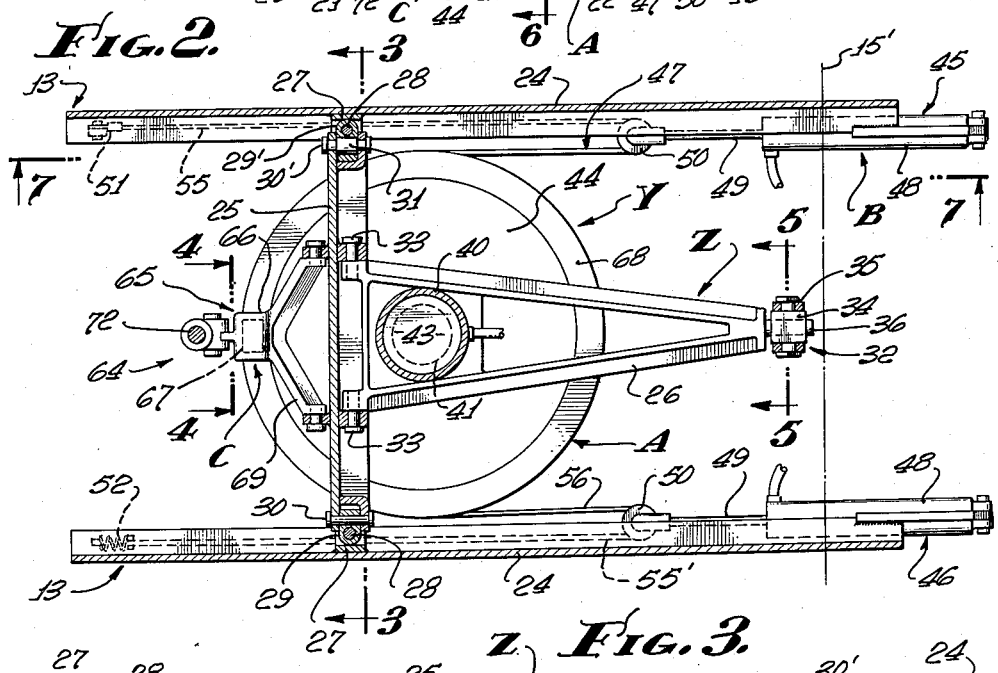
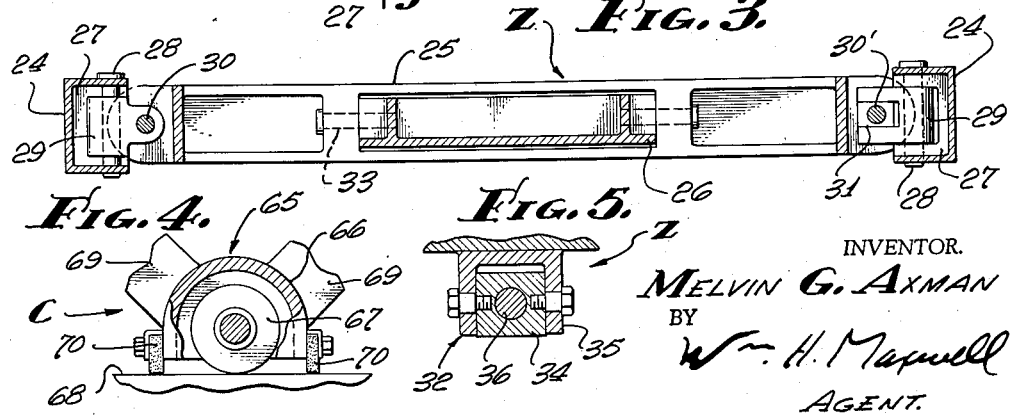
INVENTOR.
MELVIN G. AXMAN
BY
Wm. H. Maxwell
AGENT.

Jan. 3, 1961    M. G. AXMAN    2,967,045
TURNING ATTACHMENT FOR VEHICLES
Filed Sept. 3, 1957    2 Sheets-Sheet 2
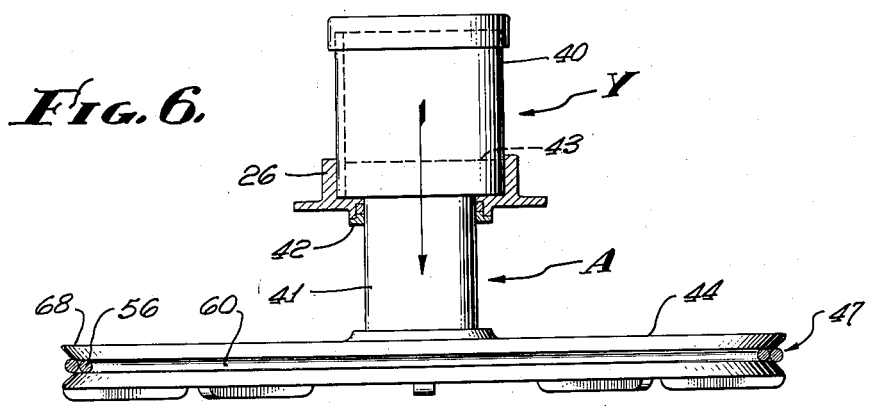
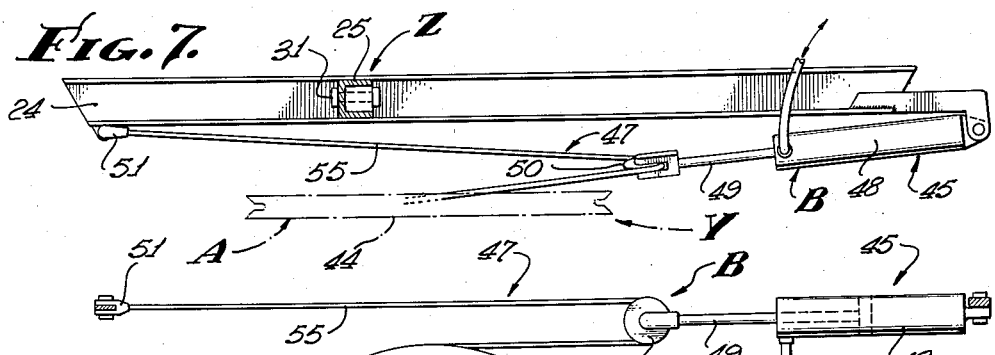
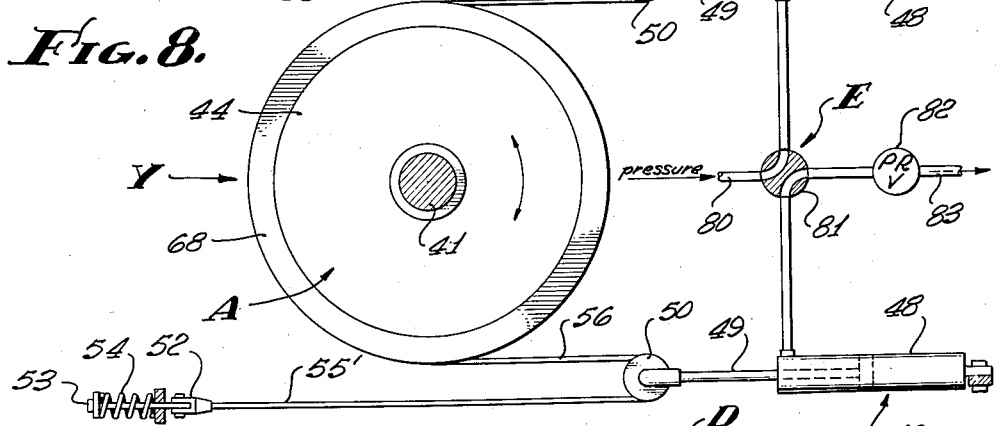
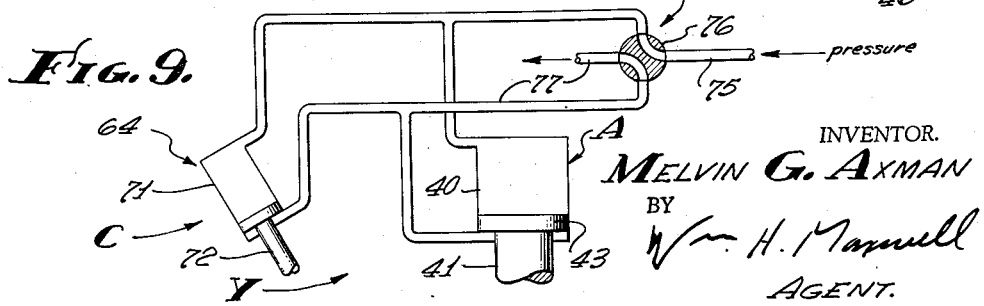
INVENTOR.
MELVIN G. AXMAN
BY
Wm. H. Maxwell
AGENT.

United States Patent Office 2,967,045
Patented Jan. 3, 1961

2,967,045

TURNING ATTACHMENT FOR VEHICLES

Melvin G. Axman, 11356 Agua Vista, North Hollywood, Calif.; Dorothy V. D. Axman, administratrix of said Melvin G. Axman, deceased Filed Sept. 3, 1957, Ser. No. 681,744

12 Claims. (Cl. 254—87)

This invention relates to a turning attachment for vehicles and is particularly concerned with an apparatus adapted to lift and turn a tractor, such as for example, a continuous tread type tractor, it being a general object of this invention to provide for greater economy in tractor operations whereby time is saved in the handling of the tractor.

Tractor type vehicles are widely employed and are particularly useful to handle earth and for this purpose are provided with apparatus in the form of attachments for carrying on specialized operations. For example, tractors are fitted out as bulldozers having a mold-board and blade for moving earth etc., and tractors are fitted out as skip-loaders having a bucket and blade for lifting and dumping earth etc. In any case, the vehicle is maneuverable and has supporting wheels or treads, and it is, therefore, to be understood that the present invention is applicable to wheeled vehicles as well as to treaded vehicles. For purpose of illustrating the invention I have shown the attachment that I provide applied to a treaded type vehicle.

Although tractor type vehicles are relatively maneuverable, they require considerable space and time in order to turn them, or to head them in the desired direction. This is particularly true in the case of continuous tread vehicles which require the expenditure of tremendous power in order to be turned, and further, turning of this type vehicle is often too damaging to the terrain, or ground surface, upon which the vehicle is operated. In many instances tractor type vehicles, such as skip-loaders, are employed in limited space or in situations which require turning the tractor around with very little or no forward or rearward motion. In this situation a great deal of time is consumed in turning the tractor and there is a waste of considerable power, and manual effort. Furthermore, turning operations as above referred to, are extremely damaging to the ground surface underlying the tractor making it more difficult for the tractor to operate.

In order to obviate the difficulties involved in turning vehicles of the type under consideration, I have provided an attachment that is adapted to lift and turn a tractor on a central vertically disposed axis. The attachment is secured to the tractor at the underside thereof and involves a vertically shiftable element that is engageable with the ground and which rotatably carries the tractor. Means is provided to shift the point of support forward of the said vertical axis to the end that a load carried in the bucket of the skip-loader does not over balance the tractor in a forward direction. The operating means that I provide are preferably hydraulically actuated since tractors of the type here under consideration are provided with a source of fluid under pressure for operating accessory equipment.

An object of this invention is to provide an attachment for vehicles of the type hereinabove referred to whereby the vehicle can be turned, or headed, about a central vertically disposed axis.

Another object of this invention is to provide a retractable supporting attachment for a vehicle upon which the vehicle can be turned on a vertically disposed axis.

It is still another object of this invention to provide means for transferring or shifting the point of support forwardly in order to balance the tractor when a load is carried in the bucket of the skip-loader or like device.

Another object of this invention is to provide an apparatus in the form of an attachment that is adapted to be installed on an existing vehicle or tractor without affecting normal operation of said tractor.

Further it is an object of this invention to provide means for operating the attachment, thus far referred to, that employs facilities already existing as standard equipment upon machines of the type under consideration.

Still another object of this invention is to provide an effective attachment that is relatively simple to manufacture, and which is easily installed in working position on the vehicle, and which is easily maintained in good working condition.

The various objects and features of my invention will be fully understood from the following detailed description of a typical preferred form and application of my invention, throughout which description reference is made to the accompanying drawings, in which:

Fig. 1 is a side elevation of a typical installation of the attachment that I provide for turning a vehicle, parts of the vehicle being broken away to expose said attachment. Fig. 2 is a plan sectional view of a portion of the vehicle and shows the attachment. Fig. 3 is an enlarged sectional view taken as indicated by line 3—3 on Fig. 2. Fig. 4 is an enlarged detailed view taken as indicated by line 4—4 on Fig. 2, with a portion thereof broken away to show in section. Fig. 5 is an enlarged detailed sectional view taken as indicated by line 5—5 on Fig. 2. Fig. 6 is an enlarged sectional view taken as indicated by line 6—6 on Fig. 1. Fig. 7 is a side elevation of a part of the structure taken as indicated by line 7—7 on Fig. 2. And, Figs. 8 and 9 are diagrammatic views of the elements of the structure as they are related to the operating means that I provide for actuation of the attachment.

As illustrated generally in Fig. 1 of the drawings, the present invention is particularly adapted to a tractor type vehicle fitted out as a skip-loader. Said tractor type vehicle X is preferably a continuous tread type vehicle having a body 10 carrying a prime mover at 11, driving facilities and controls at 12, and spaced parallel tracks 13. As shown, the vehicle X has a bucket 18 being carried ahead of the front of the body 10. The tracks 13 support and drive the vehicle and each track 13 is independently operated and the tracks are articulated to accommodate the vehicle to rough terrain. As shown, the body 10 has a gear box 14 depending at the rear thereof, there being a transversely disposed axle 15 that projects from each side of the body on an axis 15' (see Fig. 2) to carry drive wheels 16. The drive wheels 16 operate the tracks 13 each track 13 being a unit of construction that pivots on the axis 15' of the axle 15 and extends forwardly to support the forward end of the body 10 through a spring 17.

Each track 13 is a unit of construction that involves a horizontally longitudinally extending frame pivotally carried on the axis 15' of the axle 15 and which carries an idler wheel 21 at the forward end thereof and intermediate supporting rollers 22 between the drive wheel 16 and idler wheel 21. A continuous tread 23 is engaged over the wheels 16 and 21, and the track 13 is characterized by a horizontal longitudinally extending rail 24 at the inner side thereof. Since the vehicle involves spaced tracks 13, one at each side, there are spaced rails 24 exposed and accessible at the inside of the tracks 13.

In practice, the above-mentioned transverse spring 17 is pivoted by a pin 20 to the center of the body 10 on horizontal longitudinally extending axis, and the opposite ends of the spring 17 have supporting engagement with the opposite rails 24 at or near the forward end of the body 10. Thus, there is a space below the body 10 and between the gear box 14 and spring 17, this space being occupied by portions of the attachment hereinafter described.

From the foregoing it will be apparent that the vehicle X involves features of construction that allow for articulation of the individual tracks 13, and in accordance with the invention I provide a turner Y and a mounting means Z therefor which do not in any way interfere with said articulation. Generally, the turner Y involves elevating means A for lifting and lowering the vehicle X, rotating means B for turning the vehicle X when lifted, support shifting means C for moving the point of support forward of the center of rotation of the means A, a control D for the means A and C, and a control E for the means B.

The mounting means Z, in accordance with the preferred form of the invention, involves generally, a beam 25 that extends between the rails 24, and a frame 26 that extends between the beam 25 and gear box 14 of the body 10. The beam 25 is normally horizontal and extends transversely between the rails 24 at the forward end of the body, and in practice is adjacent the spring 17. The ends of the beam 25 are coupled to the opposite rails 24 in a manner to allow for independent movement of said rails. As best illustrated in Fig. 3 of the drawings, the ends of the beam 25 are universally coupled to the rails 24.

An anchor fitting 27 is secured to each rail 24 and has a vertically disposed pin 28 that swively carries a block. There is a block 29 at one end of the beam 25 that pivotally engages the beam through a pin 30 on a horizontal axis normally parallel with the rail 24, and there is a block 29' at the other end of the beam 25 which shiftably supports a slide 31 that pivotally engages the beam through a pin 30' on a horizontal axis normally parallel with the rail 24. The slide 31 is guided to shift longitudinally of the transverse beam 25 and allows for free independent movement of the two tracks 13. It is to be understood that a small amount of torsional twisting occurs between the ends of the beam 25, or if this is not desired a suitable pivot may be provided on the axis of the beam 25 to allow the opposite ends thereof to turn freely relative to each other.

The frame 26 extends between the beam 25 and a pivot fitting 32 secured to the body 10, preferably secured to the underside of the gear box 14 at the rear of the body. As clearly shown in Fig. 2 of the drawings the frame 26 is joined to the beam 25 at the forward end thereof and is a horizontally disposed elongate member. The frame 26 is pivotally joined to the beam 25 by pins 33 on an axis parallel with the beam, and the frame 26 is pivotally and slidably secured in the pivot fitting 32. The fitting 32 involves a swivel 34 carried on a transverse axis by a bracket 35 and the frame 26 has a projection 36 that slidably engages in the swivel 34 for turning and forward and aft movement. Thus, the beam 25 can move vertically relative to the body 10 and it can deviate from a normal horizontal position, all without strain upon the vehicle parts or upon the elements of the mounting Z.

The turner Y that I have provided operates to lift and to turn the vehicle X on a central vertical axis. The axis of rotation is preferably located at about the center of gravity of the vehicle X when it is in a normally unloaded condition, and in practice this axis is located just aft of the transverse spring 17 and just forward of the gear box 14. Therefore, the elevating means A for lifting and lowering the vehicle X is positioned between and occupies the above-mentioned space that occurs between the spring 17 and gear box 14 (see Fig. 1).

As best illustrated in Fig. 6 of the drawings the elevating means A involves a cylinder and piston mechanism carried by the frame 26 and on a normally vertically disposed axis. The means A has a cylinder 40 carried by the frame 26 and it has a piston or ram 41 that is shiftably carried by and projects from the lower end of the cylinder 40 when it is extended. A gland 42 is provided to seal around the ram 41 and there is a head 43 on the ram 41 and within the cylinder 40 so that the cylinder and piston mechanism is double acting and requires but a minimum of fluid to lift the ram.

A platform 44 is carried at the lower end of the ram 41 and is preferably a disc-shaped element slightly smaller in diameter than the width between the tracks 13. The ram 41 is free to rotate and the cylinder 40 acts as a bearing to allow for said rotation. In practice, the cylinder projects upward from the frame 26 to occupy the space between the spring 17 and gear box 14, and the platform 44 lies adjacent the bottom of the frame 26 when it is in the up or retracted position. When the platform 44 is lowered or extended it lies in a plane somewhat below the lower supporting treads of the tracks 13.

As best illustrated in Figs 2, 7 and 8 of the drawings, the rotating means B for turning the vehicle X involves a drive mechanism for rotating the platform 44 relative to the vehicle X. The means B may vary as circumstances require and is preferably a fluid operated means actuating the platform through flexible cable connections. The means B is shown as involving, generally, a pair of cylinder and piston mechanisms 45 and 46 carried on the vehicle X, and a cable 47 operated by the mechanisms 45 and 46 and actuating the platform 44 to turn it. The platform is turned in both directions and is permitted to be lowered and lifted relative to the vehicle X without stress or strain or adverse effect upon the parts and elements involved.

The cylinder and piston mechanisms 45 and 46 are alike and each involves a cylinder 48 carrying a piston and rod 49. In accordance with the invention the cylinder 48 is pivotally secured to the rail 24 at its rearmost end and the rod 49 projects and extends from its forward end to operate portions of the cable 47. A pulley 50 is carried at the end of each rod 49 and is free to swivel on the axis of the mechanism 45 or 46, as the case may be.

The cable 47 is shown as a single length of cable, and it extends from one rail 24 to the other and is engaged over the pulleys 50 of the two mechanisms 45 and 46 and around the platform 44. As shown, the cable 47 is rigidly anchored at 51 to the forward end of one of the rails 24 and is yieldingly anchored at 52 to the forward end of the other rail 24. The anchor at 52 may be comprised of a suitable reciprocating part 53 biased by means of a spring 54 (see Fig. 8). The two sides 55 and 55' of the cable 47 are engaged over the pulleys 50 of the two mechanisms 45 and 46, respectively, the two mechanisms 45 and 46 being positioned rearward of the means A so that the center portion 56 of the cable 47 extends forward to wrap around the platform 44.

The platform 44 has a channel 60 formed in the periphery thereof and adapted to receive the center portion 56 of the cable 47 (see Fig. 6). The channel 60 is formed to retain the cable in the channel and has flared side walls to guide and receive the cable, and has a deepened bottom to accommodate a turn of cable. In practice, frictional engagement between the cable 47 and platform 44 is sufficient to rotate the platform under normal operating conditions.

In order to turn the platform 44 with the particular means hereinabove described, the cylinder and piston mechanisms 45 and 46 are actuated to move alternately. That is, one moves outward while the other moves inward. With the pulleys 50 engaged over the cable 47, as shown, the motion of the mechanisms 45 and 46 is multiplied by two by virtue of the purchase of the "block and tackle" arrangement that I employ. It is to be understood that "block and tackle" arrangements of greater purchase may be employed, as desired.

The support shifting means C for moving the point of support forward of the center of rotation of the means A is a fluid operated means and involves, generally, a carriage 65 shiftable relative to the body 10 of the vehicle X, and means 64 operating to shift the carriage. The carriage 65 is preferably carried by the mounting Z above described and is adapted to engage with the platform 44 to support the forward end portion of the vehicle X. As shown, the carriage 65 involves a housing 66 that journals a roller 67. The carriage 65 is shiftable to a position where the roller 67 is engageable with the peripheral portion 68 of the platform 44. The carriage 65 is hinged to the beam 25 by a pair of spaced or divergent arms 69 to the end that the carriage can be shifted from an up position to a down position where the roller engages the portion 68 of the platform 44. As shown in Fig. 4, suitable wipers 70 are provided to precede the roller 67 in order to clear debris from the path of the roller.

The means 64 operating to shift the carriage 65 is preferably a fluid operated cylinder and piston means and involves a cylinder 71 and a piston and rod 72. The cylinder 71 is pivotally anchored on a transverse axis at the underside of the forward portion of the body 10 and the active end of the rod 72 is pivotally coupled to the housing 66 of the carriage 65. When the rod 72 is extended the carriage 65 is positioned as shown throughout the drawings to support the forward portion of the vehicle X at the forward peripheral portion of the platform 44. When the rod 72 is retracted the carriage 65 is positioned adacent the underside of the vehicle body 10. If desired, the mounting of the means 64 and carriage 65 can be reversed, that is, the carriage 65 can be pivotally carried by the vehicle body X while the means 64 can be pivotally carried by the beam 25.

The control means D for the means A and C is a fluid control means that governs the flow of fluid under pressure from the fluid pressure supply of the vehicle X (not shown). In Fig. 9 of the drawings I have illustrated the means D and I have indicated a source of fluid pressure in a supply line 75. Fluid under pressure to the means A and C is under control of a reversing valve 76 that admits fluid under pressure to the upper ends of the cylinders 40 and 71 when in one position, and to the lower ends of the cylinders 40 and 71 when in the other position. Fluid is exhausted from the cylinders 40 and 71 through a line 77 that returns the fluid to the fluid supply of the vehicle. It is to be understood that means can be employed, if desired, to assure that the means A operates to be lowered in advance of the lowering operation of the means C.

The control means E for the means B is a fluid control means that alternately delivers flow of fluid to the mechanisms 45 and 46, respectively. In Fig. 8 of the drawings I have illustrated the means E and I have indicated a source of fluid pressure in a supply line 80. Fluid under pressure is alternately delivered to the mechanisms 45 and 46 through a control valve 81 depending upon the direction of rotation required of the platform 44. In order to maintain tension upon the cable 47, a pressure relief valve 82 is provided in an exhaust line 83 that returns fluid to the fluid supply of the vehicle X. It will be apparent that pressure applied to one mechanism, 45 or 46, operates the other mechanism against the relief valve 82 thereby maintaining suitable tension on the cable 47.

From the foregoing it will be apparent that I have provided an attachment apparatus for vehicles, particularly endless track tractors, which operates to lift and to turn said vehicle with a minimum of effort and with a substantial savings in time. With the attachment of the present invention the operation of the vehicle is not impaired since the mounting Z allows for normal articulation of the vehicle elements and since the elements of the means A and C are easily and quickly retracted to safe limits above the ground level. With the valves 76 and 81 located at the controls at 12 it is a simple and expedient matter for the person operating the vehicle to lift and turn it in the direction desired. Further, the load carried for example, by the bucket of a skip-loader, is transferred through the support shifting means C to the outer peripheral portion of the platform 44 of the means A, and in this way bending is not imposed upon the cylinder and piston mechanism of the elevating means A.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A vehicle turning mechanism of the character described, including, elevating means for lifting and supporting the vehicle off the ground and comprising an extendable and rotatable platform underlying the vehicle, means for selectively supporting a portion of the weight of the vehicle at a point removed from the center of rotation of the platform, and rotating means for turning the vehicle relative to said elevating means when said platform is extended and said vehicle is lifted.

2. A vehicle turning mechanism of the character described, including, elevating means for lifting and supporting the vehicle off the ground and comprising an extendable and rotatable disc-shaped platform underlying the vehicle, means for selectively supporting a portion of the weight of the vehicle at a point removed from the center of rotation of the platform, comprising a vertically shiftable carriage engageable with the peripheral portion of the platform when said platform is extended, and rotating means for turning the vehicle relative to said platform when it is in an extended position.

3. A vehicle turning mechanism of the character described, including, elevating means for lifting and supporting the vehicle off the ground and comprising an extendable and rotatable disc-shaped platform underlying the vehicle, means for selectively supporting a portion of the weight of the vehicle at a point removed from the center of rotation of the platform comprising a vertically shiftable carriage having a roller engageable with the peripheral portion of the platform when said platform is extended, and rotating means for turning the vehicle relative to said platform when it is in an extended position.

4. A vehicle turning mechanism of the character described, including, elevating means for lifting and supporting the vehicle off the ground and comprising an extendable and rotatable disc-shaped platform underlying the vehicle, means for selectively supporting a portion of the weight of the vehicle at a point removed from the center of rotation of the platform, comprising an arm pivotally joined to the vehicle and carrying a vertically shiftable carriage having a roller engageable with the peripheral portion of the platform when said platform is extended, and rotating means for turning the vehicle relative to said platform when it is in said extended position.

5. A turning attachment for a continuous tread type tractor having spaced normally parallel track units each with an inner longitudinally disposed rail pivotally carried on a transverse axis at one end of the tractor, and including, a mounting for supporting engagement with said rails and comprising a beam extending between the rails and spaced from said axis, elevating means intermediate the rails and carried by the beam for lifting the vehicle off the ground, and rotating means carried by the vehicle for turning the vehicle relative to said elevating means when said vehicle is lifted thereby.

6. A turning attachment for a continuous tread type tractor having a body with laterally spaced normally parallel track units each with an inner longitudinally disposed rail pivotally carried on a transverse axis by and extending forwardly from the rear of the tractor, and including, a mounting comprising a beam extending between said rails forward of said axis and with its ends universally coupled to the rails, elevating means intermediate the rails and carried by the beam for lifting the vehicle off the ground and comprising an extendable and rotatable disc-shaped platform underlying the vehicle, and rotating means for turning the vehicle relative to said platform when it is in an extended position.

7. A turning attachment for a continuous tread type tractor having spaced normally parallel track units each with an inner longitudinally disposed rail, and including, a mounting for supporting engagement with said rails, elevating means carried by the mounting for lifting and supporting the vehicle off the ground and comprising an extendable and rotatable disc-shaped platform underlying the vehicle, means for selectively supporting a portion of the weight of the vehicle at a point removed from the center of rotation of the platform comprising a vertically shiftable carriage engageable with the peripheral portion of the platform when said platform is extended, and rotating means for turning the vehicle relative to said platform when it is in said extended position.

8. A turning attachment for a continuous tread type tractor having a body and with laterally spaced normally parallel track units each with an inner longitudinally disposed rail pivotally carried on a transverse axis by and extending forwardly from the rear of the tractor, and including, a mounting comprising a beam extending between said rails forward of said axis and with its ends universally coupled to the rails and a frame extending between the beam and tractor body at said axis, said frame being pivotally coupled to the beam and universally coupled to the body, elevating means intermediate the rails and carried by the frame for lifting the vehicle off the ground, and rotating means for turning the vehicle relative to said elevating means when the vehicle is lifted.

9. A turning attachment for a continuous tread type tractor having a body and with laterally spaced normally parallel track units each with an inner longitudinally disposed rail pivotally carried on a transverse axis by and extending forwardly from the rear of the tractor, and including, a mounting comprising a beam extending between said rails forward of said axis and with its ends universally coupled to the said rails and a frame extending between the beam and tractor body at said axis, said frame being pivotally coupled to the beam and universally coupled to the body, elevating means intermediate the rails and carried by the frame for lifting the vehicle off the ground and comprising an extendable and rotatable disc-shaped platform underlying the vehicle, and rotating means for turning the vehicle relative to said platform and comprising a cable with end portions anchored to opposite sides of the vehicle and with a portion engaged with said disc-shaped platform and cylinder and piston means actuating the cable, one of said end portions of the cable being yieldingly anchored.

10. A vehicle turning mechanism of the character described, including, elevating means for lifting the vehicle off the ground and comprising an underlying disc-shaped platform extendable from and rotatable relative to the vehicle, and rotating means for turning the vehicle relative to said elevating means and comprising, a cable having a center portion engaged with said disc-shaped platform and with end portions anchored to the vehicle, one of said end portions being yieldingly anchored, and means actuating the cable to shift it in the direction of the cable length, whereby the platform is rotated relative to the vehicle.

11. A vehicle turning mechanism of the character described, including, elevating means for lifting the vehicle off the ground and comprising an underlying disc-shaped platform extendable from and rotatable relative to the vehicle, and rotating means for turning the vehicle relative to said elevating means and comprising, a cable having a center portion engaged with said disc-shaped platform and with end portions anchored to opposite sides of the vehicle, one of said end portions being yieldingly anchored, and a means carried by said opposite sides of the vehicle and engaged with opposite end portions of the cable to shift it in the direction of the cable length, whereby the platform is rotated relative to the vehicle.

12. A turning attachment for a continuous tread type tractor having a body and with laterally spaced tracks pivotally carried on a transverse axis by and extending forwardly from the rear of the tractor and each with a longitudinally disposed rail, and including, a mounting comprising a beam extending between said rails forward of said axis and a frame extending between the beam and tractor body at said axis, elevating means intermediate the rails and carried by the frame for lifting the vehicle off the ground, and rotating means carried by the vehicle for turning the vehicle relative to said elevating means when said vehicle is lifted thereby.

References Cited in the file of this patent

UNITED STATES PATENTS

| | | |
|---|---|---|
| 667,312 | Hetlesaeter | Feb. 5, 1901 |
| 1,653,247 | Zollinger | Dec. 20, 1927 |
| 1,797,830 | Koehler | Mar. 24, 1931 |
| 1,800,379 | Davis | Apr. 14, 1931 |
| 1,930,959 | Potvin et al. | Oct. 17, 1933 |
| 2,157,404 | Dodge et al. | May 9, 1939 |